Figures 1, 2:
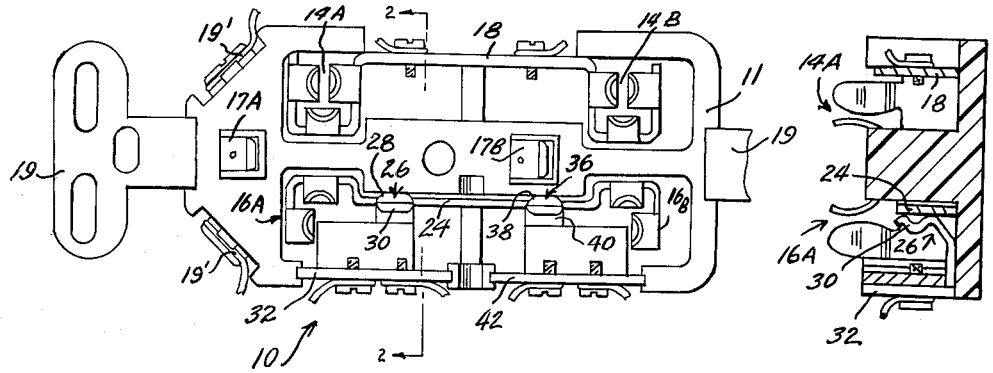

April 12, 1966   R. K. BERNER   3,246,179
ELECTRICAL OUTLET HAVING DOUBLE THROW SWITCH FOR CONNECTION
TO POWER LINE THROUGH ALTERNATE CIRCUIT PATHS
Filed Dec. 28, 1962   2 Sheets-Sheet 1

Ray K. Berner, INVENTOR.

BY L. L. Saulsbury
Attorney

April 12, 1966   R. K. BERNER   3,246,179
ELECTRICAL OUTLET HAVING DOUBLE THROW SWITCH FOR CONNECTION
TO POWER LINE THROUGH ALTERNATE CIRCUIT PATHS
Filed Dec. 28, 1962   2 Sheets-Sheet 2

Ray K. Berner, INVENTOR.

BY L. S. Saulsbury
Attorney

United States Patent Office 3,246,179
Patented Apr. 12, 1966

3,246,179
ELECTRICAL OUTLET HAVING DOUBLE THROW SWITCH FOR CONNECTION TO POWER LINE THROUGH ALTERNATE CIRCUIT PATHS
Ray K. Berner, Santa Ana, Calif., assignor of fifty percent to Francis H. Gates, Sr.
Filed Dec. 28, 1962, Ser. No. 247,990
7 Claims. (Cl. 307—114)

This invention relates to electrical outlet devices, such as plug-in wall outlets, and to electrical circuits including such outlet devices, and more particularly to an electrical outlet which may be selectively pre-set in such manner as to be directly connected to the electrical power supply, or, alternatively, so as to be connected to the electrical power supply through a switch which is external of or remotely located relative to the plug-in outlet.

In many electrical installations, particularly in residential electrical wiring, it is sometimes desirable that a given electrical outlet or group of outlets be connected to the electrical power supply through a switch located away from the outlet or outlets, while at other times, it is desirable that the same outlet or outlets be directly connected to electrical power without being subject to control by the remote switch. Thus, at different times a given outlet or outlets may have different requirements with respect to whether it is energized directly from the electrical power source, or whether it is energized from the power source through a switch external of or remote from the outlet. It is also desirable that any control for selectively determining how a given outlet shall be energized, as just described, should form an integral part of the structure of the outlet.

Accordingly, it is an object of this invention to provide an electrical outlet device which may be selectively connected directly to electrical power or alternatively may be connected to electrical power through a separate switch externally located with respect to the outlet device, and to provide an improved electrical circuit including such an outlet device.

It is another object of the invention to provide an electrical outlet having a built-in selector mechanism which permits the electrical outlet to be selectively connected either directly to electrical power or to be connected to electrical power in series with an external switch.

In achievement of these objectives, there is provided in accordance with an embodiment of this invention an electrical outlet device including a pair of plug-in receptacles each including a positive and a negative contact, with contacts of the same polarity of the two receptacles being connected in parallel with each other. The contacts of one polarity, such as negative polarity, are directly connected to the negative side of the electrical supply. The outlet device is provided with built-in means for selectively connecting the contacts of the other polarity, such as positive polarity, either directly to the positive side of the electrical power supply without an intervening disconnect switch, or alternatively to the positive side of the electrical power supply in series with an external or remotely located control or disconnect switch. In the specific embodiment disclosed, the means for selectively connecting the positive contacts of the switch as just described includes a rocker arm carried by the outlet and having pushbuttons at the opposite ends thereof. By pushing one of the pushbuttons, the rocker arm is rocked in one direction to effect the interruption of one of the alternative electrical connections of the positive receptacle contacts to the power supply, such as the direct connection to the power supply of the positive contacts, and to simultaneously effect the connection of the other of the alternative electrical connections of the positive contacts to the power supply, such as the connection of the positive contacts of the outlet to the electrical power supply in series with an external or remote switch.

A plurality of outlet devices of the type just described may be electrically connected in parallel with each other, with corresponding terminals of the respective outlets connected to each other, and with each outlet being independently selectively connected either directly to electrical power or alternatively to electrical power through a disconnect switch external of or remote from the outlets.

Figure 3:
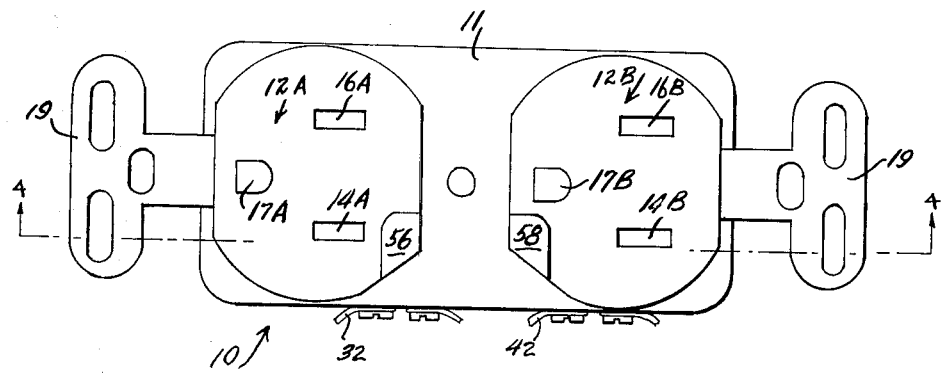
Figure 4:
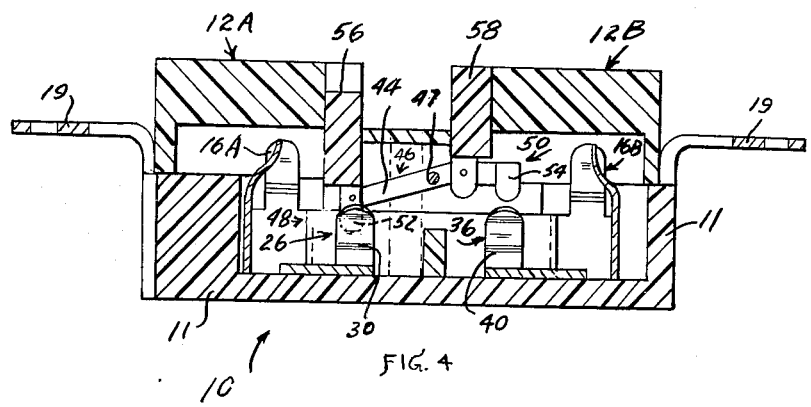
Figure 5:
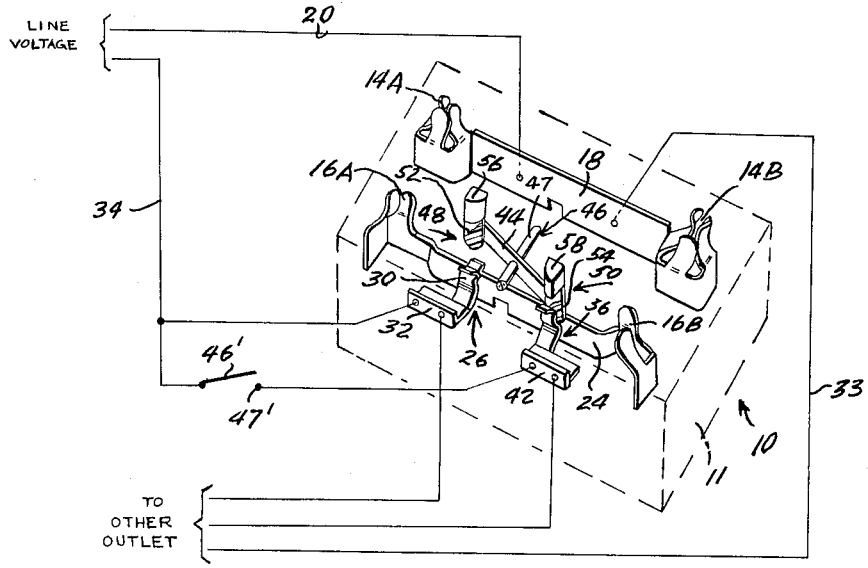
Figure 7:
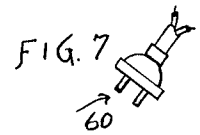
Figure 6:
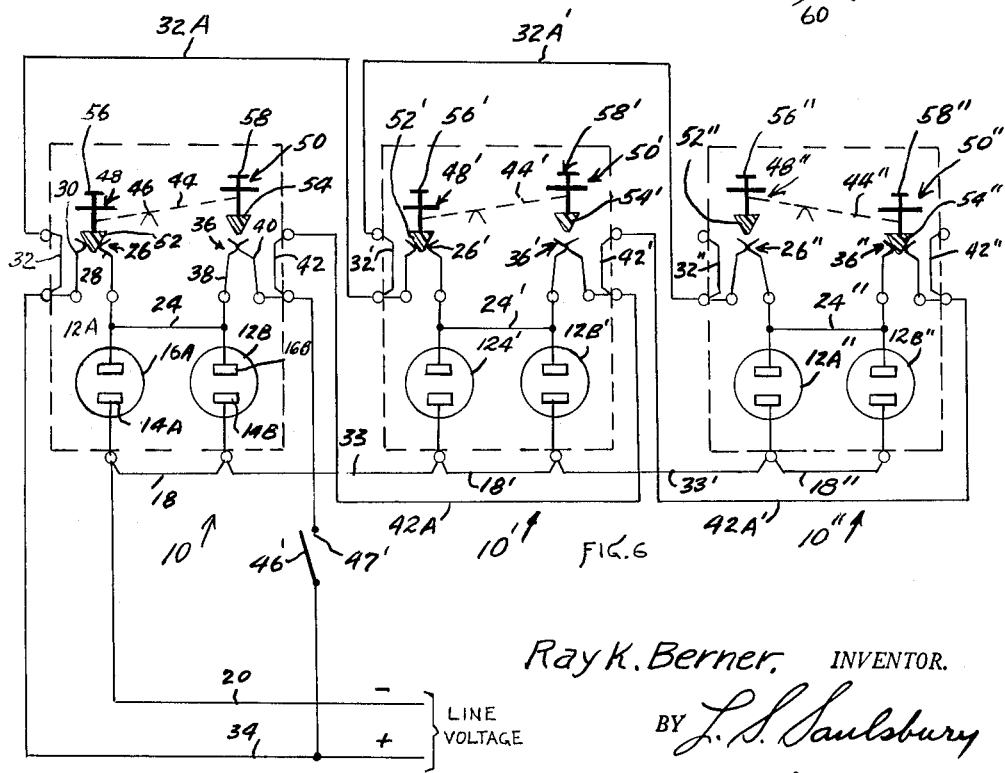

Further objects and advantages of the invention will become apparent from the following description taken in conjunction with the accompanying drawing, in which FIGURE 1 is a plan view of an electrical outlet in accordance with the invention with the cover of the outlet removed to permit better visability of the internal construction of the outlet, FIG. 2 is a view in transverse section along line 2—2 of FIGURE 1, FIG. 3 is a top plan view of the outlet of FIG. 1 with the cover in position on the outlet, FIG. 4 is a view in longitudinal section along line 4—4 of FIG. 3, FIG. 5 is a perspective view of the operating mechanism of the outlet device of FIG. 1, and FIG. 6 is a wiring diagram showing a plurality of the electrical outlets of FIG. 1 connected in parallel with each other, and FIG. 7 is a side elevational view of a plug member.

It is common practice within the building trades to install a wall switch to control one of the outlets within the living area for coming into the building from the outside. These circuits have a disadvantage that the lighting has to be from that outlet to the wall switch, it hampers the lighting effects desired by the homemaker, who wishes to move the furniture and lamps in this area. Therefore, an outlet with a built-in switch that may be switched from the switch leg to the hot wire individually controlled by the wall switch or controlled without the wall switch for individual outlets, singularly or multiple, thus allowing freedom of lighting effects to suit one's tastes has herein been provided.

The drawings illustrated in FIG. 6 is a type of circuit that may be used showing three outlets for a typical living room of a home but is not limited to any area. The outlets have one wall switch which may control the outlet singularly or in multiples, or none of the outlets. Each outlet has an individual switching means to cause the outlet to be switched to a hot wire or a switch leg. FIGS. 1, 2, 3, 4 show the outlet receptacle and the switch of the receptacle.

Referring now to the drawing, the electrical outlet of the invention is generally indicated at 10 and includes a body or housing 11 suitably recessed to receive two plug-in receptacles generally indicated at 12A and 12B, respectively. Each of the receptacles 12A, 12B include a pair of contacts 14A and 16A, 14B and 16B, respectively. Corresponding parts of the two receptacles are designated by the same reference numerals but with the suffix "A" or "B," depending on whether the element is in the "A" or "B" receptacle. The body 11 has mounting brackets 19 attached to opposite ends thereof for mounting the outlet 10 on a wall or the like.

Each repectacle 12A or 12B may optionally be provided with a grounding pole 17A or 17B and grounding bus bars 19′ are optionally mounted on the outlet body 11.

The terminals 14A and 14B of the receptacles 12A and 12B are directly connected together by a bus conductor 18 which, in turn, is directly connected to the negative side 20 of the electrical power supply. The two contacts 16A and 16B of the receptacles 12A and 12B are directly connected to each other by a bus conductor 24.

Bus conductor 24 is electrically connected to one contact jaw 28 of a double jaw spring contact switch generally indicated at 26. The opposite contact jaw 30 of switch 26 is connected to a bus member 32 which, in turn, is connected to the positive side 34 of the electrical power supply. The bus member 24 which connects the two positive terminals 16A and 16B of the receptacles 12A and 12B is also connected to one contact jaw 38 of a double jaw spring contact switch generally indicated at 36. The opposite jaw 40 of spring contact switch 36 is connected to a bus member 42 which, in turn, is connected through rocker arm conductor 44 to single pole switch 46 and thence to the positive side 34 of the electrical power supply.

In the actual construction of the outlet member, the contact jaw 28 of double jaw spring contact switch 26 and the contact jaw 38 of double jaw spring contact switch 36 may be formed integrally with bus member 24.

Each of the outlets 10 is provided with means for connecting the bus conductor 24 of each of the respective outlets and hence the positive receptacle contacts 16A and 16B connected to bus 24 selectively either through double jaw spring contact switch 26 directly to power line 34, or, alternatively, through double jaw spring contact 36 to power line 34 in series with single pole disconnect switch 46.

The mechanism for selectively connecting bus 24 and contacts 16A and 16B as just described will now be explained. A rocker arm 44 is supported intermediate its length on a rocker shaft 47 which is suitably supported in the outlet housing for rocking movement. Contact separators generally indicated at 48 and 50 are mounted at opposite ends of the rocker arm 44. Each of the contact separators 48 and 50 includes a contact separator element, respectively indicated at 52 and 54, these elements 52 and 54 being formed of suitable insulating material and preferably being of wedge shape. The respective contact separators 48 and 50 are provided with push-buttons respectively indicated at 56 and 58.

It will be seen that when the push button 56 of the contact separator 48 is pushed downwardly the insulated separator element 52 will engage between the contact jaws 28 and 30 of the spring contact switch 26 to disconnect bus 24 from its direct connection to positive power line 34. At the same time, due to the pivotal mounting of rocker arm 44, the contact separator 50 at the opposite end of the rocker arm 44 will move upwardly to a position in which the insulated contact separator element 54 is disengaged from the jaws 38 and 40 of spring contact switch 36 to permit a direct electrical contact between the jaws 38 and 40, thereby directly connecting bus 24 to conductor 44 and thence to terminal 47 of single pole disconnect or control switch 46'. If switch 46' is closed, a connection is thereby completed from positive power line 34 through switch 46', conductor 44, and double jaw switch 36 to conductor bus 24.

As best seen in the views of FIGS. 3 and 4, the push buttons 56 and 58 of the respective contact separator members 48 and 50 are movable in vertical passages in the receptacles 12A and 12B, and are mounted in such manner that when one of the push buttons 56 or 58 is pushed downwardly or inwardly, the other push button is forced upwardly or outwardly so as to be flush with the outer face of the receptacle. Furthermore, the switch separator members 48 and 50 are so mounted and proportioned by the push buttons 56 and 58 are so mounted and proportioned with respect to each other and with respect to the double jaw spring contact switches 26 and 36 which they engage that one of the switch separator members 52 or 54 in moving inwardly will engage the jaws of its corresponding switch 26 or 36 before the opposite separator element 52 or 54 has become disengaged from the opposite switch 26 or 36.

As best seen in the schematic diagram of FIGURE 6, a plurality of the outlet devices 10, 10' and 10" may be connected in parallel with each other. The outlet devices 10' and 10" are similar to the outlet device 10 just described and hence will not be separately described. The conductor buses 32, 32' and 32" of the respective outlets 10, 10' and 10" may be connected together by conductors 32A and 32A'. Similarly, the corresponding bus members 42, 42', 42" of the respective outlets 10, 10', 10" may be connected together by the conductors 42A and 42A'. Also, the corresponding negative bus members 18, 18' and 18" of the respective outlets 10, 10' and 10" are connected to each other by conductors 33 and 33'.

Referring now to FIG. 6, it will be seen that when a plurality of the outlets 10, 10' and 10" are connected in parallel with each other as shown in the view of FIG. 6 that the individual outlets 10, 10', 10" may be selectively connected either directly to the electrical power supply without an intervening disconnect or control switch, or may be connected to the electric power supply in series with a control switch, as desired.

Thus, the rocker arms 44 and 44' of the outlets 10 and 10' as seen in FIG. 6 are in a position in which the respective double jaw spring contact switches 26 and 26' are engaged by the respective contact separator members 48 and 48' of the two outlets 10 and 10' so that the bus members 24 and 24' of the respective outlets are disconnected or isolated from the direct connection to the positive power line 34. At the same time the separator elements 54 and 54' are disengaged from switches 36 and 36' so that the double jaw spring contact switches 36 and 36' of the respective outlets 10 and 10' are electrically connected to the terminal 47 of single pole switch 46 and thence, if switch 46 is closed, to positive power line 34. In other words, the rocker arms 44 and 44' of the respective outlets 10 and 10' are so positioned that the plug-in receptacles of these two outlets are electrically energized through the remote or external switch 46, rather than being directly connected to the electrical power supply.

If the plug member 60 is plugged into any of the receptacles 12A, 12B, 12A' or 12B' of the outlets 10 or 10', no electrical power would be available to plug 60 with the circuit in the position shown in FIG. 6, due to the fact that the single pole switch 46 is open. However, if the single pole switch 46 is closed, plug 60 would derive power from the receptacles 12A, 12A', 12B, 12B' of the respective outlets 10 or 10'.

The rocker arm 44" of the outlet 10" is in a position in which the jaws of the double jaw contact switch 36" are separated by the separator element 54", thereby disconnecting bus bar 24" from bus 42" and from switch 46 which connects to the positive power line 34. At the same time, the opposite separator element 48" of outlet 10" is in the retracted position in which the jaws of the double jaw contact switch 26" engage each other in electrically conductive relation, thereby connecting bus member 24" of outlet 10" to the bus 32", and hence connecting receptacles 12A" and 12B" of outlet 10" directly to positive power line 34, without an intervening disconnect or control switch.

It can be seen from the foregoing that there is provided in accordance with this invention an electrical outlet and associated electrical circuitry which have great utility, and which permit the outlet to be selectively connected directly to electrical power or to electrical power in series with a switch located externally or remotely with respect to the outlet. The selector mechanism for controlling the alternative circuits through which the outlet is energized is integral with the outlet and may be selectively actuated to one or the other of its positions to determine the energization circuit for the outlet.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What is claimed is:

1. An electrical outlet device comprising a support mounting a first and a second electrical contact respectively adapted to be connected to first and second electrical power lines, means for connecting one of said contacts directly to one of said power lines, first and second alternative circuit paths connecting said second electrical contact to the other of said power lines, a first and a second normally closed switch in the respective circuit paths and mounted on said support to complete the respective paths from said second contact to said other power line, a rocker arm pivotally supported for rocking movement on said support, a first and a second circuit opening means mounted on said rocker arm on opposite sides of the pivotal support therefor, said first and second circuit opening means being respectively adapted to engage said first and said second normally closed switch whereby one of said circuit opening means engages its corresponding switch to open the circuit path of the respective switch and whereby the other circuit opening means is substantially simultaneously moved out of engagement with the other normally closed switch to permit said other normally closed switch to return to its normally closed position in which its respective circuit path is rendered effective to connect said second contact to said other power line.

2. An electrical outlet device comprising a support mounting a first and a second electrical contact respectively adapted to be connected to first and second electrical power lines, means for connecting one of said contacts directly to one of said power lines, first and second alternative circuit paths connecting said second electrical contact to the other of said power lines, a first and a second normally closed switch in the respective circuit paths and mounted on said support to complete the respective paths from said second contact to said other power line, each of said normally closed switches comprising a pair of spring contact elements which when engaged with each other complete a conductive path therebetween and which when separated define an open circuit therebetween, a rocker arm pivotally supported for rocking movement on said support, a first and a second contact separator means mounted on said rocker arm on opposite sides of the pivotal support therefor, said first and second contact separator means being respectively adapted to engage said first and second normally closed switch whereby one of said contact separator means engages its corresponding switch to open the circuit path of the respective switch and whereby the other contact separator means is substantially simultaneously moved out of engagement with the other normally closed switch to permit said other normally closed switch to return to its normally closed position in which its respective circuit path is rendered effective to connect said second contact to said other power line.

3. An electrical outlet device for connection to a first and a second electrical power line comprising a pair of electrical receptacles each including a first and a second electrical contact, with corresponding electrical contacts of the respective receptacles being electrically connected in parallel with each other to define two separate sets of parallel-connected electrical contacts, one set of parallel-connected electrical contacts being connected directly to one of said power lines, and means for selectively connecting the other set of parallel-connected electrical contacts to the other of said power lines through one or the other of two alternative circuit paths.

4. An electrical outlet device as defined in claim 3, in which one of said alternative circuit paths includes in combination therewith a disconnect switch located remotely from said outlet device.

5. An electrical outlet device for connection to a first and a second electrical power line, comprising a pair of electrical receptacles each including a first and a second electrical contact, with corresponding electrical contacts of the respective receptacles being electrically connected in parallel with each other to define two separate sets of parallel-connected electrical contacts, one set of parallel-connected electrical contacts being connected directly to one of said power lines, first and second alternative circuit paths connecting the other set of electrical contacts to the other of said power lines, and means for selectively interrupting one of said circuit paths and for substantially simultaneously rendering effective the other of said circuit paths from said other set of electrical contacts to the other of said power lines.

6. In combination, a plurality of electrical outlet devices each comprising a support mounting a first and a second electrical contact, the first and second electrical contacts of each electrical outlet device being adapted to be connected to first and second electrical power lines, means connecting the first contacts of the respective outlet devices in parallel with each other and directly to one of said power lines, first and second alternative circuit paths to the other of said power lines, one of said alternative circuit paths being connected directly to the other of said power lines, the other of said alternative circuit paths being connected to said other power line in series with a disconnect switch located remotely from all of said outlet devices, means for connecting the second contacts of the respective outlet devices to each of said first and second alternative circuit paths, and means carried by each support for selectively connecting its respective second contact to one of said alternative circuit paths and for substantially simultaneously disconnecting the respective second contact from the other of said alternative circuit paths.

7. In combination, a plurality of electrical outlet devices for connection to a first and a second electrical power line, each of said outlet devices comprising a support mounting a pair of electrical receptacles each including a first and a second electrical contact, with corresponding electrical contacts of the respective receptacles of a given outlet being electrically connected in parallel with each other to define two separate sets of parallel-connected electrical contacts in each outlet, means connecting one set of contacts of the plurality of outlet devices in parallel with each other and directly to one of said power lines, first and second alternative circuit paths to the other of said power lines, one of said alternative circuit paths being connected directly to the other of said power lines, the other of said alternative circuit paths being connected to said other power line in series with a disconnect switch located remotely from all of said outlet devices, means for connecting the other set of contacts of each respective outlet device to each of said first and second alternative circuit paths, and means carried by each support for selectively connecting its respective other set of contacts to one of said alternative circuit paths and for substantially simultaneously disconnecting its respective other set of contacts from the other of said alternative circuit paths.

References Cited by the Examiner
UNITED STATES PATENTS

| 1,131,469 | 3/1915 | Cole | 307—114 |
| 2,072,389 | 3/1937 | Stayton | 307—114 |
| 2,565,075 | 8/1951 | Harcharek | 200—51.02 |
| 2,706,225 | 4/1955 | Freeman | 307—114 |
| 2,907,855 | 10/1959 | Hedges | 307—114 X |

LLOYD McCOLLUM, *Primary Examiner.*

ROBERT K. SCHAEFER, *Examiner.*

R. S. MACON, W. M. SHOOP, *Assistant Examiners.*